United States Patent
Smith et al.

(10) Patent No.: US 6,619,153 B2
(45) Date of Patent: Sep. 16, 2003

(54) SPRING-LOADED FORK ASSEMBLY FOR SHIFT SYSTEM

(75) Inventors: William E. Smith, Liverpool, NY (US); Matthew Malinowski, Oneida, NY (US); Stephen M. Dolan, Liverpool, NY (US)

(73) Assignee: New Venture Gear, Inc., Troy, MI (US)

( * ) Notice: Subject to any disclaimer, the term of this patent is extended or adjusted under 35 U.S.C. 154(b) by 2 days.

(21) Appl. No.: 10/087,335

(22) Filed: Feb. 28, 2002

(65) Prior Publication Data

US 2002/0139215 A1 Oct. 3, 2002

Related U.S. Application Data

(60) Provisional application No. 60/280,273, filed on Mar. 30, 2001.

(51) Int. Cl.[7] ............................................. B60K 20/00
(52) U.S. Cl. ................................. 74/473.37; 74/337.5
(58) Field of Search ........................ 74/473.1, 473.37, 74/473.36, 473.29, 337.5

(56) References Cited

U.S. PATENT DOCUMENTS

| | | | |
|---|---|---|---|
| 3,596,534 A | * 8/1971 | Logan | 74/473.1 |
| 4,529,080 A | 7/1985 | Dolan | 192/109 |
| 4,619,151 A | * 10/1986 | Trachman et al. | 74/473.1 |
| 4,770,280 A | 9/1988 | Frost | 192/53 |
| 5,517,876 A | 5/1996 | Genise et al. | 74/473 R |
| 6,450,057 B1 | * 9/2002 | Winkler et al. | 74/473.37 |

* cited by examiner

Primary Examiner—Thomas R. Hannon
Assistant Examiner—Bradley J. Van Pelt
(74) Attorney, Agent, or Firm—Harness, Dickey & Pierce P.L.C.

(57) ABSTRACT

A shift system for a transfer case including a spring-loaded range fork assembly operable for shifting a range sleeve between two speed range positions. The range fork assembly includes a bracket, a range fork, and a spring assembly. The spring assembly is compressed and inserted into chambers formed in both the bracket and range fork. The range fork assembly is slidably maintained on a shift rail and the range fork is coupled to the range sleeve. An actuator mechanism is provided for causing selective axial movement of the range fork assembly on the rail. The spring assembly allows the bracket to shift and apply a shift force on the range fork. This shift force causes the range fork to slide the range sleeve to the desired range position.

26 Claims, 3 Drawing Sheets

SPRING-LOADED FORK ASSEMBLY FOR SHIFT SYSTEM

CROSS-REFERENCE TO RELATED APPLICATIONS

This application claims the benefit of U.S. Provisional Application Serial No. 60/280,273, filed Mar. 30, 2001.

BACKGROUND OF THE INVENTION

The present invention relates generally to shift systems for transmissions and transfer cases of the type used in the driveline of motor vehicles. Specifically, the present invention is directed to a spring-loaded shift fork assembly for use in such shift systems.

It is known in the automobile industry to equip power transfer assemblies (i.e., manual transmissions, transfer cases, etc.) with a shift system having spring-loaded shift devices for completing a delayed gear or mode shift once speed synchronization or a torque break occurs. Examples of conventional spring-loaded shift systems are disclosed in U.S. Pat. Nos. 4,529,080, 4,770,280 and 5,517,876. In each of these patents, a pair of springs are used to provide a bi-directional preload function for effectuating coupling of a dog-type shift sleeve with a desired gearset. While such arrangements are satisfactory for their intended purpose, a need exists to develop simpler, more cost-effective alternatives that provide the desired function while advancing the art.

SUMMARY OF THE INVENTION

Accordingly, it is an object of the present invention to provide an improved shift system for a power transmission device having a spring-loaded shift fork assembly.

As a related object, the shift system of the present invention is adapted for use with the range shift mechanism of a four-wheel drive transfer case.

As a still further object, the shift system of the present invention is adapted for use with a gearshift mechanism of a multi-speed transmission or transaxle.

According to a preferred embodiment of the present invention, a shift system for a transfer case includes a spring-load range fork assembly operable for shifting a range sleeve between two speed range positions. The range fork assembly includes a bracket, a range fork, and a spring assembly. The spring assembly is compressed and inserted into chambers formed in both the bracket and range fork. The range fork assembly is slidably maintained on a shift rail and the range fork is coupled to the range sleeve. An actuator mechanism is provided for causing selective axial movement of the range fork assembly on the rail. During operation of the transfer case, the transmission of drive torque while shifting into either speed range may create a resistance force which impedes the axial movement of the range sleeve. However, the spring assembly allows the bracket to shift and apply a shift force on the range fork. When a torque reversal occurs, the shift force causes the range fork to slide the range sleeve to the desired position.

Additional advantages and features of the present invention will become apparent from the subsequent description and the appended claims, taken in conjunction with the accompanying drawings.

BRIEF DESCRIPTION OF THE DRAWINGS

Further objects, features and advantages of the present invention will become apparent from the following detailed specification and the appended claims which, in conjunction with drawings, set forth the best mode now contemplated for carrying out the invention. Referring to the drawings:

DETAILED DESCRIPTION OF THE INVENTION

In general the present invention is directed to a shift system of the type used in motor vehicle power transmission devices for effectuating axial movement of a coupling member (i.e., a shift sleeve) to shift between gear ratios or drive modes. Thus, while the present invention is shown specifically associated with the range shift system of a two-speed transfer case, it will be appreciated that the present invention is also applicable for use with the mode shift system of the transfer case as well as for use with the gearshift system of multi-speed gear-change transmissions.

Figure 1:
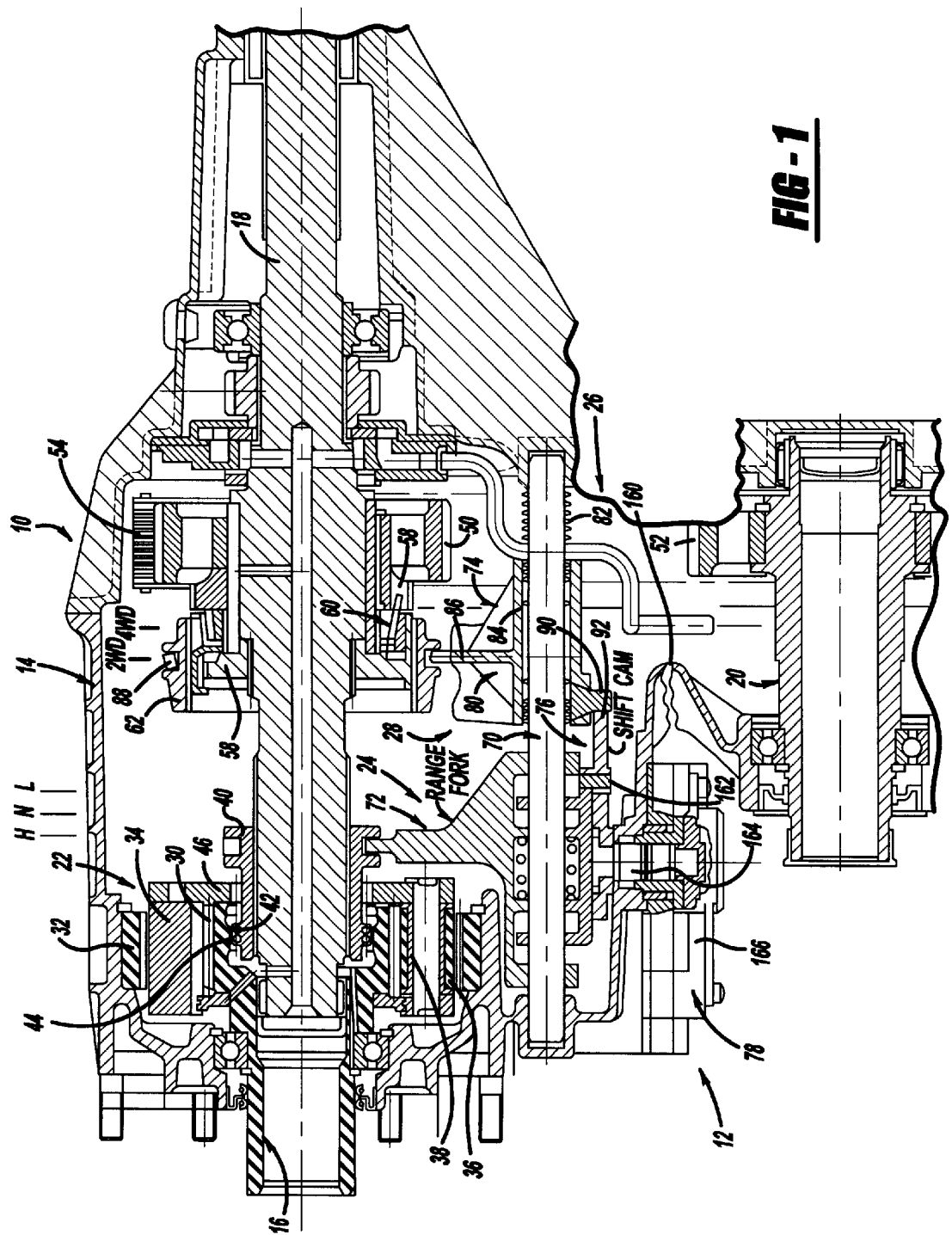
FIG. 1 is a sectional view of an exemplary four-wheel drive transfer case with which the shift system of the present invention may be utilized.

Referring to FIG. 1, an exemplary construction for a two-speed transfer case 10 is shown to be equipped with a shift system 12 according to the present invention. Transfer case 10 also includes: a housing 14; an input shaft 16 rotatably supported from housing 14; a rear output shaft 18 rotatably supported between input shaft 16 and housing 14; a front output shaft 20 rotatably supported from housing 14; a planetary gearset 22 driven by input shaft 16; a range clutch 24 for selectively coupling one of a high-range output and a low-range output of planetary gearset 22 to rear output shaft 18, a transfer mechanism 26 driven by front output shaft 20; and a mode clutch 28 for selectively coupling transfer mechanism 26 to rear output shaft 18. As will be detailed, shift system 12 controls actuation of range clutch 24 and mode clutch 28 for establishing various operational drive modes.

Planetary gearset 22 includes: a sun gear 30 driven by input shaft 16; a ring gear 32 non-rotatably fixed to housing 14; a planet carrier 34; and a set of planet gears 36 rotatably supported on pins 38 mounted to planet carrier 34 and which are meshed with sun gear 30 and ring gear 32. Range clutch 24 includes a range sleeve 40 which is splined for rotation with rear output shaft 18 and axial sliding movement thereon between a high-range (H) position, a neutral (N) position, and a low-range (L) position. In the high-range position, clutch teeth 42 on range sleeve 40 are meshed with clutch teeth 44 on sun gear 30 for establishing a first or direct ratio drive connection between input shaft 16 and rear output shaft 18 such that transfer case 10 operates in a High-Range drive mode. In the low-range position, clutch teeth 42 on range sleeve 40 are meshed with clutch teeth 46 on planet carrier 34 for establishing a second or reduced ratio drive connection between input shaft 16 and rear output shaft 18 such that transfer case 10 operates in a Low-Range drive mode. Finally, with range sleeve 40 in its neutral position clutch teeth 42 are disengaged from clutch teeth 44 on stubshaft 31 and clutch teeth 46 on planet carrier 34 for establishing a non-driven Neutral mode for transfer case 10.

Transfer mechanism 26 is shown to include a first sprocket 50 rotatably supported on rear output shaft 18, a second sprocket 52 fixed to front output shaft 20, and a power chain 54 connecting first sprocket 50 to second sprocket 52. Mode shift mechanism 28 includes a clutch hub 56 fixed to rear output shaft 18, a clutch gear 58 fixed to first sprocket 50, a synchronizer 60 disposed between clutch hub 56 and clutch gear 58, and a mode sleeve 62 splined for rotation with clutch hub 56 and axial movement thereon between a two-wheel drive (2WD) position and a four-wheel drive (4WD) position. In its 2WD position, mode sleeve 62 is disengaged from clutch gear 58 and transfer mechanism 26 is uncoupled from rear output shaft 18 such that transfer case 10 is operating in a Two-Wheel Drive mode. When mode sleeve 62 is slid axially to its 4WD position, synchronizer 60 is energized to synchronize the speed of first sprocket 50 to that of rear output shaft 18. Once the synchronization process is complete, mode sleeve 62 is permitted to move into coupled engagement with clutch gear 58 for coupling transfer mechanism 26 to rear output shaft 18 and establishing the Four-Wheel Drive mode.

To provide means for coordinating the axial movement of range sleeve 40 between its three distinct range positions and mode sleeve 62 between its two distinct mode positions, shift system 12 includes: a shift rail 70 mounted to housing 14; a spring-loaded range fork assembly 72 supported on shift rail 70; a mode fork assembly 74 supported on shift rail 70; a sector plate 76 operably coupled to range fork assembly 72 and mode fork assembly 74; and a shift actuator 78 for causing controlled rotary movement of sector plate 76. As seen best from FIG. 1, mode fork assembly 74 includes a mode fork 80 and a biasing spring 82. Mode fork 80 has a tubular sleeve segment 84 journalled on shift rail 70 and a fork segment 86 extending from sleeve segment 82 with a C-shaped end portion 88 retained in an annular groove formed in mode sleeve 62. A mode pin 90 is secured to sleeve segment 84 and bears against a mode cam surface 92 formed along an outer edge of sector plate 76. Cam surface 92 is contoured such that rotation of sector plate 76 via actuation of shift actuator 78 causes corresponding axial sliding movement of mode fork 80 on shift rail 70. Such axial movement of mode fork 80 results in corresponding axial movement of mode sleeve 62 between its 2WD and 4WD positions. Spring 82 is coaxially mounted on shift rail 70 and acts on mode fork 80 to maintain engagement of mode pin 90 with mode cam surface 92.

Figure 2:
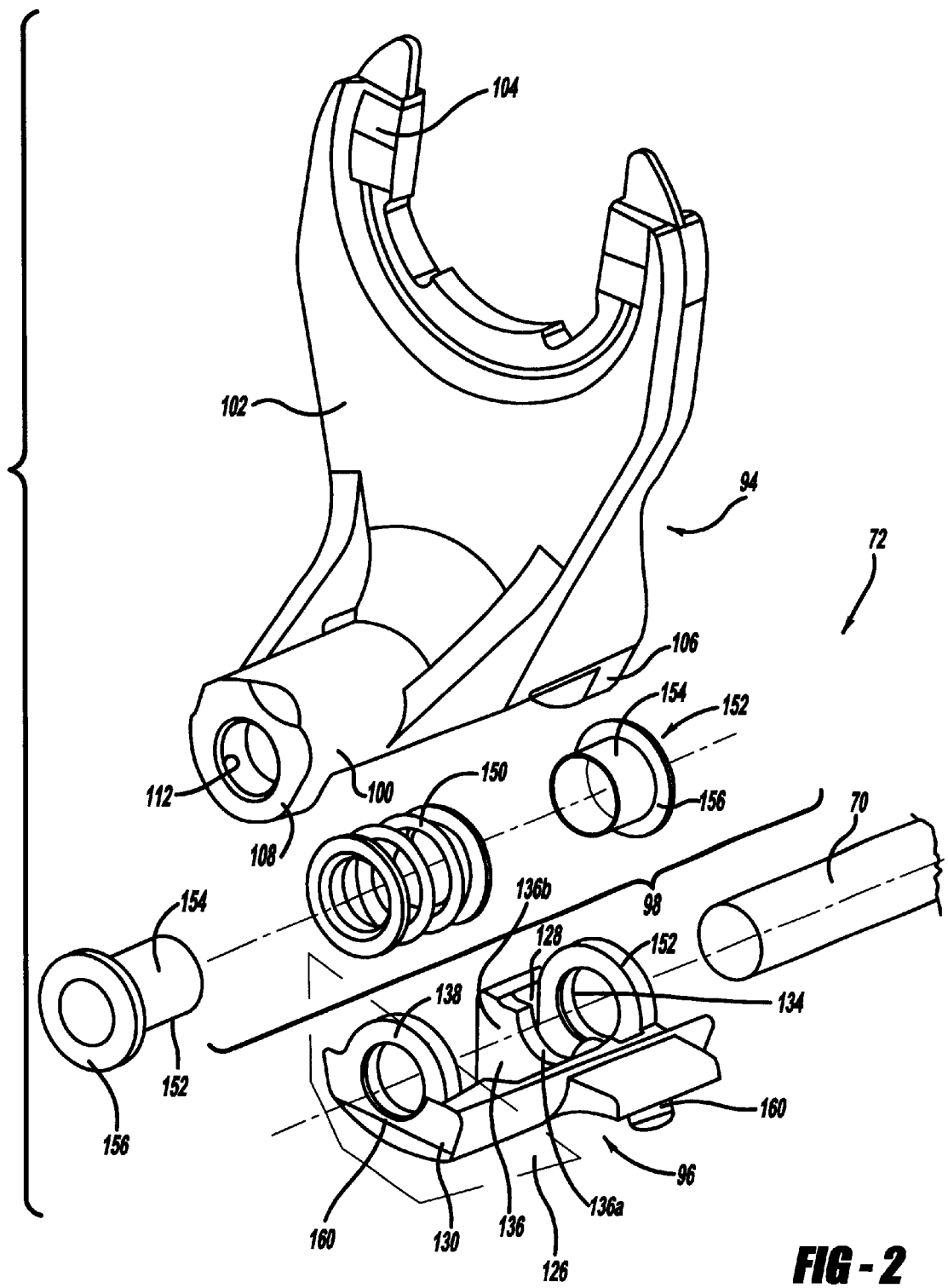
FIGS. 2 and 3 are exploded perspective views of the spring-load shift fork assembly associated with the shift system of the present invention.
Figure 3:
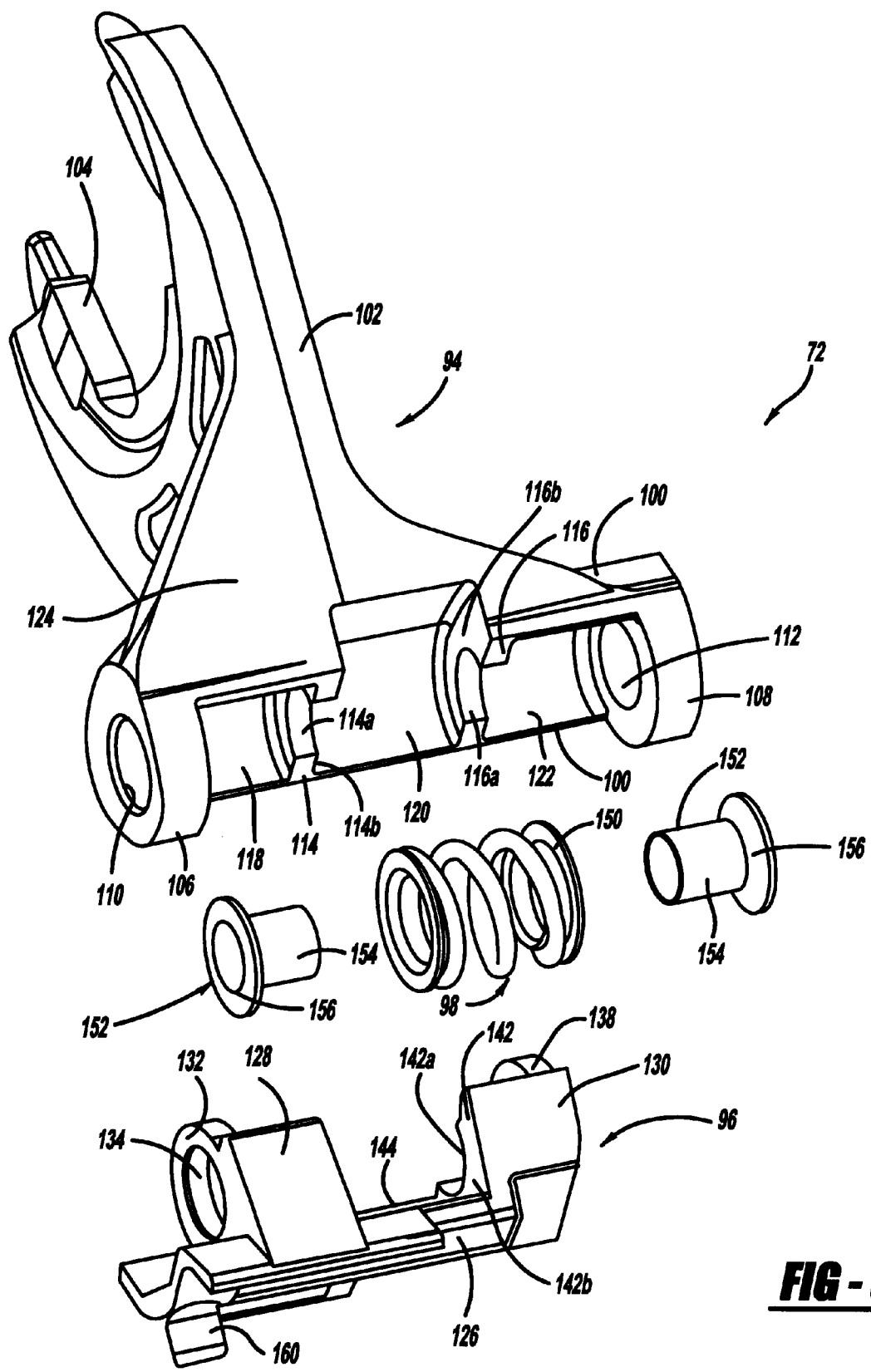

Referring now primarily to FIGS. 2 and 3, range fork assembly 72 is shown to include a range fork 94, a bracket 96, and a spring assembly 98. Range fork 94 includes a cylindrical tubular body segment 100 and a fork segment 102 extending orthogonally from body segment 100 with its C-shaped end portion 104 adapted for retention in an annular groove formed in range sleeve 40. A pair of disc-like annular end flanges 106 and 108 are formed at opposite ends of body segment 100. Apertures 110 and 112 are formed through end flanges 106 and 108, respectively, and are sized to permit sliding insertion of shift rail 70 therethrough. A pair of truncated flanges 114 and 116 are formed between end flanges 106 and 108 and include arcuate support surfaces 114a and 116a, respectively, adapted to support shift rail 70 thereon. Thus, body segment 100 of range fork 94 defines three distinct cavities, namely, a first end cavity 118, a central cavity 120, and a second end cavity 122. Gussets 124 extend between body segment 100 and fork segment 102 to stiffen range fork 94 and minimize bending.

Bracket 96 of range fork assembly 72 is shown to include a base segment 126 and a pair of laterally-spaced lug segments 128 and 130. Lug segment 128 includes a disc-like end flange 132 with an aperture 134 therethrough, and a truncated flange 136 having an arcuate support surface 136a. Similarly, lug segment 130 includes a disc-like end flange 138 with an aperture 140 therethrough, and a truncated flange 142 having an arcuate support surface 142a. Apertures 134 and 140 are adapted to permit sliding insertion of shift rail 70 therethrough while support surfaces 136a and 142a of truncated flanges 136 and 142 are adapted to support shift rail 70. In addition, a spring cavity 144 is formed between truncated flanges 136 and 142.

Spring assembly 98 includes a coil spring 150 and a pair of tubular washer sleeves 152 which are inserted into opposite ends of coil spring 150. Each washer sleeve 152 has a thin-walled tubular body segment 154 and a radial flange segment 156 extending from one end of body segment 154. The outer diameter of body segment 154 for each washer sleeve 152 is sized to fit inside coil spring 150 while its inner diameter is sized to permit shift rail 70 to extend therethrough. Thus, body segments 154 act as spring guides for the opposite ends of coil spring 150. In addition, the end surfaces of coil spring 150 are adapted to engage flange segments 156 of washer sleeves 152.

The components of range fork assembly 72 are pre-assembled prior to mounting on shift rail 70. Specifically, spring assembly 98 is compressed and placed in spring cavity 144 of bracket 96 such that a portion of the outer face surface of flange segment 156 on each washer sleeve 152 engages a corresponding inner face surface 136b and 142b of truncated flanges 136 and 142, respectively. Thereafter, bracket 96 is brought into mating engagement with body segment 100 of range fork 94 such that spring cavity 144 is aligned with central cavity 120 to define an enclosed spring chamber. As such, a portion of the outer face surfaces of flange segments 156 on each washer sleeve 152 also engages a corresponding inner face surface 114b and 116b of truncated flanges 114 and 116, respectively, for retaining spring assembly 98 within the spring chamber. In this assembled arrangement, end flange 132 of lug segment 128 is positioned within first end cavity 118 and end flange 138 of lug segment 130 is positioned within second end cavity 122. Moreover, lug apertures 134 and 140 are colinearly aligned with end flange apertures 110 and 112 as well as with the apertures through washer sleeves 152 so as to permit shift rail 70 to be slid through the aligned apertures for mounting range fork assembly 72 thereon for sliding movement. Since coil spring 150 is compressed prior to installation into spring cavity 144 of bracket 96, it is preloaded for generating a "self-centering" feature whereby truncated flanges 114 and 116 on range fork 94 are radially aligned with truncated flanges 136 and 142 on bracket 96, as shown in FIG. 1. Optionally, spring assembly 98 can initially be installed in center cavity 120 of range fork 94 with bracket 96 thereafter assembled with range fork 94.

A range pin 160 is secured to base segment 126 of bracket 96 and is retained in a range cam slot 162 formed in sector plate 76. Thus, rotation of sector plate 76 is adapted to cause sliding axial movement of range fork assembly 72 on shift rail 70 which, in turn, results in axial movement of range sleeve 42 between its H, N and L range positions. Sector plate 76 has mode cam surface 90 and range cam slot 162 arranged to provide coordinated axial movement of mode fork assembly 74 and range fork assembly 72 in response to rotation of an output member 164 of shift actuator 78. Preferably, sector plate 76 can be rotated to four distinct positions for establishing a Two-Wheel High-Range drive mode (2WD-H), the Four-Wheel High-Range drive mode (4WD-H), the Neutral mode (N) and the Four-Wheel Low-Range drive mode (4WD-L). Shift actuator 78 is shown as a gearmotor/encoder assembly 166 operable to receive an electric shift signal which is indicative of the selected drive mode from a mode selector (not shown) that is controlled by the vehicle operator. Based on the selected mode, shift actuator 78 causes sector plate 76 to be rotated to the desired position. However, the spring-loaded feature of range fork assembly 72 allows axial movement of range fork 94 to lag behind that of bracket 96, via compression of coil spring 150, when residual drag or an instantaneous torque lock condition prevents engagement of clutch teeth 42 on range sleeve 40 with the clutch teeth on sun gear 30 or planet carrier 34. For example, if the vehicle operator desires to shift transfer case 10 from the 4WD-H drive mode into the 4WD-L drive mode, a suitable signal is sent to gearmotor/ encoder assembly 166 which causes sector plate 76 to rotate to the corresponding sector position. Such sector rotation does not cause movement of mode sleeve 62 out of its 4WD position but does cause bracket 96 to move axially due to the travel of range pin 160 in range cam slot 162. Coil spring 150 urges range fork 94 to move axially in concert with bracket 96. However, if misalignment of clutch teeth 46 on planet carrier 34 with clutch teeth 42 on range sleeve 40 prevents movement of range sleeve 40 to its L position, coil spring 150 is compressed in excess of its preload for applying a biasing load on range fork 94. Once the misalignment is eliminated, coil spring 150 forces continued axial movement of range fork 94 which, in turn, causes range sleeve 40 to move into its L position with range fork 94 being again centered relative to bracket 96.

Thus, the single spring configuration of the present invention provides a bi-directional spring-loaded function for accommodating shifts into and out of all of the available ranges. Moreover, this arrangement prevents potential damage to gearmotor/encoder assembly 166 by preventing excessive motor current when a shift can not be immediately completed since sector plate 76 is permitted to rotate to the desired sector position while coil loading spring 150 to subsequently cause movement of range fork 94 and effectuate coupling of range sleeve 40. In manually-shifted systems, a shift lever can be moved by the vehicle operator to rotate sector plate 76. While disclosed in association with transfer case 10, spring-biased range fork assembly 72 can also be used in automatically-shifted ("automated") manual transmissions and transaxles where a power-operated (i.e., electrical, hydraulic) actuator is used to move a shift sleeve into and out of engagement with constant-mesh gearsets to effectuate a gear change.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A shift mechanism operably disposed within a transfer case for establishing operable communication between a range sleeve and a shift actuator, comprising:

a shift rail;

a first bracket slidably disposed on said shift rail and in operable communication with the shift actuator;

a second bracket slidably disposed on said shift rail; and a spring operably disposed on said shift rail and in operable communication with said first and second brackets, said spring biasing said second bracket in a direction of motion of said first bracket for enabling delayed, corresponding motion of the range sleeve, wherein a first end of said spring is in contact with first faces of each of said first and second brackets and a second end of said spring is in contact with second faces of each of said first and second brackets, whereby biasing force against one of said first and second ends of said spring transfers through said spring and respectively biases one of said first and second faces of said first bracket.

2. The shift mechanism of claim 1, further comprising first and second washer sleeves inserted into corresponding ends of said spring, said washer sleeves each comprising a radially extending flange, wherein said radially extending flange of said first washer sleeve is in contact with said first faces of each of said first and second brackets and said radially extending flange of said second washer sleeve is in contact with said second faces of each of said first and second brackets.

3. The shift mechanism of claim 1, wherein the shift actuator initiates axial movement of said first bracket along said shift rail.

4. The shift mechanism of claim 3, wherein said first bracket induces corresponding axial movement of said second bracket along said shift rail.

5. The shift mechanism of claim 1, wherein a cavity is defined between said first and second brackets, said spring being disposed within said cavity.

6. The shift mechanism of claim 1, further comprising first and second washer sleeves inserted into corresponding ends of said spring, and wherein said shift rail extends through each of said washer sleeves for enhancing sliding motion of said spring along said shift rail.

7. The shift mechanism of claim 1, wherein said second bracket includes an extending arm for engaging the range sleeve.

8. The shift mechanism of claim 7, wherein said extending arm generally forms a range fork for engaging the range sleeve.

9. The shift mechanism of claim 1, wherein said spring is a coil spring.

10. A shift mechanism operably disposed within a transfer case for establishing operable communication between a range sleeve and a shift actuator thereof, comprising:

a shift rail;

a first bracket slidably disposed on said shift rail and in operable communication with the shift actuator, said first bracket including an engagement pin for establishing operable communication with the shift actuator and at least one trunnion slidably engaging said shift rail;

a second bracket slidably disposed on said shift rail and including a radially extending engagement arm for engaging the range sleeve and at least one trunnion slidably engaging said shift rail; and a spring operably disposed on said shift rail and in operable communication with said first and second brackets, said spring biasing said second bracket in a direction of motion of said first bracket for enabling delayed, corresponding motion of the range sleeve, wherein a first end of said spring is in contact with first faces of each of said first and second brackets and a second end of said spring is in contact with second faces of each of said first and second brackets, whereby a biasing force against one of said first and second ends of said spring transfers through said spring and respectively biases one of said first and second faces of said first bracket.

11. The shift mechanism of claim 10, further comprising first and second washer sleeves inserted into corresponding ends of said spring, said washer sleeves each comprising a radially extending flange, wherein said radially extending flange of said first washer sleeve is in contact with said first faces of each of said first and second brackets and said radially extending flange of said second washer sleeve is in contact with said second faces of each of said first and second brackets.

12. The shift mechanism of claim 10, wherein the shift actuator initiates axial movement of said first bracket along said shift rail.

13. The shift mechanism of claim 12, wherein said first bracket induces corresponding axial movement of said second bracket along said shift rail.

14. The shift mechanism of claim 10, wherein a cavity is defined between said first and second brackets, and wherein said spring is disposed within said cavity.

15. The shift mechanism of claim 11, further comprising first and second washer sleeves inserted into corresponding ends of said spring, said shift rail extending through each of said washer sleeves for enhancing sliding motion of said spring along said shift rail.

16. The shift mechanism of claim 10, wherein said engaging arm generally forms a fork for engaging the range sleeve.

17. The shift mechanism of claim 10, wherein said spring is a coil spring.

18. A transfer case, comprising:
- a housing;
- an input shaft rotatably supported on said housing and adapted to receive a drive torque input;
- an output shaft rotatably supported by said housing;
- a gear reduction unit driven by said input shaft and having first and second rotary outputs driven at corresponding first and second speed ratios;
- a range sleeve operable for selectively coupling said first and second rotary outputs to said output shaft;
- a shift actuator in operable communication with said range sleeve for inducing shifting motion thereof; and
- a shift mechanism enabling operable communication between said shift actuator and said range sleeve, said shift mechanism including a shift rail, a first bracket slidably disposed on said shift rail and in operable communication with the shift actuator, a second bracket slidably disposed on said shift rail and in operable communication with said first and second rotary outputs, and a spring operably disposed on said shift rail and in operable communication with said first and second brackets, said spring biasing said second bracket in a direction of motion of said first bracket for enabling delayed, corresponding motion of said range sleeve, wherein a first end of said spring is in contact with first faces of each of said first and second brackets and a second end of said spring is in contact with second faces of each of said first and second brackets, whereby biasing force against one of said first and second ends of said spring transfers through said spring and respectively biases one of said first and second faces of said first bracket.

19. The transfer case of claim 18, further comprising first and second washer sleeves inserted into corresponding ends of said spring, said washer sleeves each comprising a radially extending flange, wherein said radially extending flange of said first washer sleeve is in contact with said first faces of each of said first and second brackets and said radially extending flange of said second washer sleeve is in contact with said second faces of each of said first and second brackets.

20. The transfer case of claim 18, wherein the shift actuator initiates axial movement of said first bracket along said shift rail.

21. The transfer case of claim 20, wherein said first bracket induces corresponding axial movement of said second bracket along said shift rail.

22. The transfer case of claim 18, wherein a cavity is defined between said first and second brackets, and wherein said spring is disposed within said cavity.

23. The transfer case of claim 18, further comprising first and second washer sleeves inserted into corresponding ends of said spring, said shift rail extending through each of said washer sleeves for enhancing sliding motion of said spring along said shift rail.

24. The transfer case of claim 20, wherein said second bracket includes an extending arm for engaging said range sleeve.

25. The transfer case of claim 24, wherein said extending arm generally forms a range fork for engaging said range sleeve.

26. The transfer case of claim 18, wherein said spring is a coil spring.

* * * * *